United States Patent
Suermondt et al.

(10) Patent No.: US 7,707,058 B2
(45) Date of Patent: Apr. 27, 2010

(54) PREDICTING PARTS NEEDED FOR AN ONSITE REPAIR USING EXPECTED WASTE DERIVED FROM REPAIR HISTORY

(75) Inventors: Henri Jacques Suermondt, Sunnyvale, CA (US); George Henry Forman, Orchard, WA (US); Nina Mishra, San Ramon, CA (US)

(73) Assignee: Hewlett-Packard Development Company, L.P., Houston, TX (US)

(*) Notice: Subject to any disclaimer, the term of this patent is extended or adjusted under 35 U.S.C. 154(b) by 1308 days.

(21) Appl. No.: 09/945,193

(22) Filed: Aug. 31, 2001

(65) Prior Publication Data

US 2003/0050824 A1    Mar. 13, 2003

(51) Int. Cl.
*G06F 17/30* (2006.01)
(52) U.S. Cl. ........................................................ 705/10
(58) Field of Classification Search ...................... 705/7, 705/10
See application file for complete search history.

(56) References Cited

U.S. PATENT DOCUMENTS

| | | | | |
|---|---|---|---|---|
| 4,757,463 A | * | 7/1988 | Ballou et al. | 701/35 |
| 5,216,612 A | * | 6/1993 | Cornett et al. | 700/96 |
| 5,287,267 A | * | 2/1994 | Jayaraman et al. | 705/10 |
| 5,596,712 A | * | 1/1997 | Tsuyama et al. | 714/26 |
| 5,682,421 A | * | 10/1997 | Glovitz et al. | 379/100.05 |
| 5,953,707 A | * | 9/1999 | Huang et al. | 705/10 |
| 6,343,236 B1 | * | 1/2002 | Gibson et al. | 700/79 |
| 6,438,292 B1 | * | 8/2002 | Bona et al. | 385/37 |
| 6,473,659 B1 | * | 10/2002 | Shah et al. | 700/79 |
| 6,625,589 B1 | * | 9/2003 | Varma et al. | 706/45 |
| 6,647,371 B2 | * | 11/2003 | Shinohara | 705/10 |
| 6,751,536 B1 | * | 6/2004 | Kipersztok et al. | 701/29 |
| 6,820,038 B1 | * | 11/2004 | Wetzer et al. | 702/184 |
| 6,832,205 B1 | * | 12/2004 | Aragones et al. | 705/10 |
| 6,892,317 B1 | * | 5/2005 | Sampath et al. | 714/4 |
| 6,922,687 B2 | * | 7/2005 | Vernon | 707/1 |
| 2001/0034673 A1 | * | 10/2001 | Yang et al. | 705/28 |
| 2002/0156692 A1 | * | 10/2002 | Squeglia et al. | 705/26 |
| 2002/0161458 A1 | * | 10/2002 | Ahrens et al. | 700/21 |
| 2003/0055753 A1 | * | 3/2003 | Dellar et al. | 705/29 |
| 2003/0195778 A1 | * | 10/2003 | Smith | 705/7 |

FOREIGN PATENT DOCUMENTS

JP    2003067162 A  *  3/2003

OTHER PUBLICATIONS

Smith, Stephen et al., Optimal Inventories based on job completion rate for repairs requiring multiple items Management Science, Aug., 1980, vol. 26, No. 8, pp. 849-852.*

(Continued)

*Primary Examiner*—Scott L Jarrett

(57) ABSTRACT

A method for predicting parts for onsite repair which takes into account a repair history and the costs associated with mis-predictions. Parts for onsite repair of a product are predicted by determining an expected waste for one or more parts of the product. The parts having a lowest expected waste are selected and sent to the onsite repair. The expected waste indicates parts that are responsible for high support costs and highlights the mistakes being made and scores the mistakes by actual cost.

26 Claims, 3 Drawing Sheets

OTHER PUBLICATIONS

Mamer, John et al., Optimizing Field Repair Kits Based on Job Completion Rate Management Science, Nov. 1982, vol. 28, No. 11, pp. 1328-1333.*

Botter, Rene et al., Stocking Strategy for service parts—a case study International Journal of Operations & Production Management, 2000, vol. 20, No. 6, p. 656.*

Rustenburg, W.D. et al., Spare parts management for technical systems IIE Transactions, Oct. 2000, vol. 32, No. 10, pp. 1013-1026.*

Katzel, Jeanine, Maintenance management software Plant Engineering, vol. 41, Jun. 18, 1987.*

Cohen, Morris et al., Out of Touch with Customer Needs? Spare Parts and After Sales Service Sloan Management Review, Winter 1990, vol. 31, No. 2, pp. 55-66.*

Cohen, Morris et al., Identifying Opportunities for Improving Teradyne's Service-Parts Logistics System Interfaces, Jul./Aug. 1999, vol. 29, No. 4, pp. 1-18.*

Hall, John, Software to make the field tech's job easier? Air Conditioning, Heating & Refrigeration News, Mar. 13, 2000, vol. 209, No. 11, p. 15.*

Albright, Brian, The just-in-case supply chain Frontline Solutions, vol. 2, No. 10, Sep. 2001.*

FieldCentrix.com—Web Pages Mar. 2000, Retrieved from Archive.org Sep. 21, 2005.*

Xelus.com—Web Pages Apr. 2001, Retrieved from Archive.org Sep. 21, 2005.*

Patton, Joseph et al., Service Parts Handbook Second Edition The Solomon Press, 2003, ISBN: 0-934623-99-6.*

Mamer, John W. et al., Job Completion Based Inventory Systems: Optimal Policies for Repair Kits and Spare Machines Management Science, vol. 31, No. 6, Jun. 1985, pp. 703-718.*

Servigistics Delivers First Web-based Service Planning and Forecasting Solution Business Wire, Jan. 25, 2000.*

Xelus to Add Field-Based Planning to Compaq's Service Supply Chain PR Newswire, Mar. 5, 2001.*

Krizner, Ken, Solution takes control of parts inventory levels Frontline Solutions, Apr. 2001, vol. 2, No. 4, pp. 16-17.*

Servigistics Announces PartsPlan Version 6.0: Web-Based Parts Planning and Forecasting Extended to UNIX Platforms While Adding Key Functionality Enhancements, Business Wire, May 14, 2001.*

Terry, Lisa, The Forgotten Supply Chain: Service Parts IDSystems.com: Real World Logistics, Jun. 20, 2001.*

Xelus.com Web Pages Xelus, Apr. 2001, Retrieved from Archive.org Apr. 11, 2006.*

Patton, Joseph D. et al., Service Management Principles and Practice—Third Edition ISA Press, 1994, ISBN: 1-55617-491-8.*

Graves, Stephen C., A Multiple-Item Inventory Model With A Job Completion Criterion Management Science, Vo. 28, No. 11, Nov. 1982, pp. 1334-1337.*

Cohen, Morris et al., Near-Optimal Service Constrained Stocking Policies for Spare Parts Operations Research, Jan./Feb. 1989, vol. 37, No. 1, pp. 104-117.*

Cohen, Morris et al., Optimizer: IBM's Multi-Echelon Inventory System for Managing Service Logistics Interfaces, Jan.-Feb. 1990, pp. 65-82.*

Lahiri, Santi B, A decision-support modeling system for minimization of logistic support cost Production and Inventory Management Journal, Fourth Quarter 1992, vol. 33, No. 4, pp. 75-80.*

Ricardo, Ernst et al., Dealer Inventory Management Systems IIE Transactions, Sep. 1993, vol. 25, No. 5, pp. 36-49.*

Snyder, RD., A computerized system for forecasting spare part sales: A case study International Journal of Operations & Production Management, vol. 13, No. 7, 1993.*

Langan, George, Maintenance Automation: Out of the broom closet and into the boardroom IIE Solutions, Jul. 1995, vol. 27, No. 7, pp. 14-17.*

Beck, Jeff, Statistical process control and selectable forecast calendars reduce GE aircraft engines' parts inventory, Product and Inventory Management Journal, Third Quarter 1999, vol. 40, No. 3, pp. 62-66.*

Heuts, RMJ et al., A combined forecast—inventory control procedure for spare parts Journal of the Operational Research Society, vol. 51, No. 10, Oct. 2000.*

Cohen, Morris et al., Saturn's Supply-Chain Innovation: High Value in After Sales Service Sloan Management Review, Summer 2000, vol. 41, No. 4, pp. 93-101.*

Ashayeri, J et al., Inventory Management of Repairable Service Parts for Personal Computers International Journal of Operations & Production Management, vol. 16, No. 12, 1996.*

Teachey, Daniel, What Is A CMMS, And Why Should You Care? EC&M, Mar. 1, 1998.*

Lamendola, Mark, Beyond Work Oders: Get More from your CMMS EC&M, Oct. 1, 1999.*

Orsburn, Douglas K., Spares Management Handbook McGraw Hill, 1991, ISBN: 0-8306-7626-0.*

Wang, Yunzeng, Service Parts Logistics: Modeling, Analysis and Application University of Pennslyvania, Dissertation, 1998, UMI No. 9830011.*

Joseph D. Patton Jr. & Herber C. Feldman, Service Parts Handbook The Solomon Press Publishers, 1997, ISBN: 0-934623-73-2.*

Wimsatt, Alison, Applications: A Smart way to improve maintenance management IIE Solutions, vol. 30, No. 12, Dec. 1998, pp. 72-73.*

Tinham, Brian, Productive maintenance keep on trucking Manufacturing Computer Solutions, vol. 6, No. 8, Sep. 2000, pp. 20-23.*

Stagnaro, Stephanie, Understanding the "alphabet soup" pf maintenance management Plant Engineering, vol. 55, No. 2, Feb. 2001, pp. 105-106.*

* cited by examiner

PREDICTING PARTS NEEDED FOR AN ONSITE REPAIR USING EXPECTED WASTE DERIVED FROM REPAIR HISTORY

BACKGROUND OF THE INVENTION

1. Field of Invention

The present invention pertains to the field of onsite repair. More particularly, this invention relates to predicting parts for onsite repair.

2. Art Background

It is common in a wide variety of business arrangements to provide onsite product repair. For example, it is common to provide onsite repair of computer systems, instruments, and appliances to name just a few examples.

An onsite repair of a product usually includes the replacement of one or more parts of the product. A service technician usually travels to the repair site and takes along one or more replacement parts for possible use in the repair.

Typically, the cost of performing an onsite repair is increased if a poorly chosen set of replacement parts is sent to the repair site with a service technician. For example, if parts essential to a repair are not available to a service technician at the site then the service technician usually makes a return trip to the repair site, thereby increasing the cost of the onsite repair. In addition, if a service technician takes an unneeded part to a repair site then the unneeded part is usually returned to an inventory facility and re-stocked which also increases the cost of the onsite repair as well as inventory costs.

In prior methods, repair parts are usually chosen based on the judgment of personnel such as call qualifiers or service technicians. Unfortunately, such methods typically do not provide a systematic solution that takes into account the costs associated with choosing the wrong replacement parts.

SUMMARY OF THE INVENTION

A method is disclosed for predicting parts for onsite repair which takes into account a repair history and the costs associated with mis-predictions. Parts for onsite repair of a product are predicted by determining an expected waste for one or more parts of the product. The parts having a lowest expected waste are selected and sent to the onsite repair. The expected waste indicates parts that are responsible for high support costs and highlights the mistakes being made and scores the mistakes by actual cost.

Other features and advantages of the present invention will be apparent from the detailed description that follows.

BRIEF DESCRIPTION OF THE DRAWINGS

The present invention is described with respect to particular exemplary embodiments thereof and reference is accordingly made to the drawings in which.

DETAILED DESCRIPTION

Figure 1:
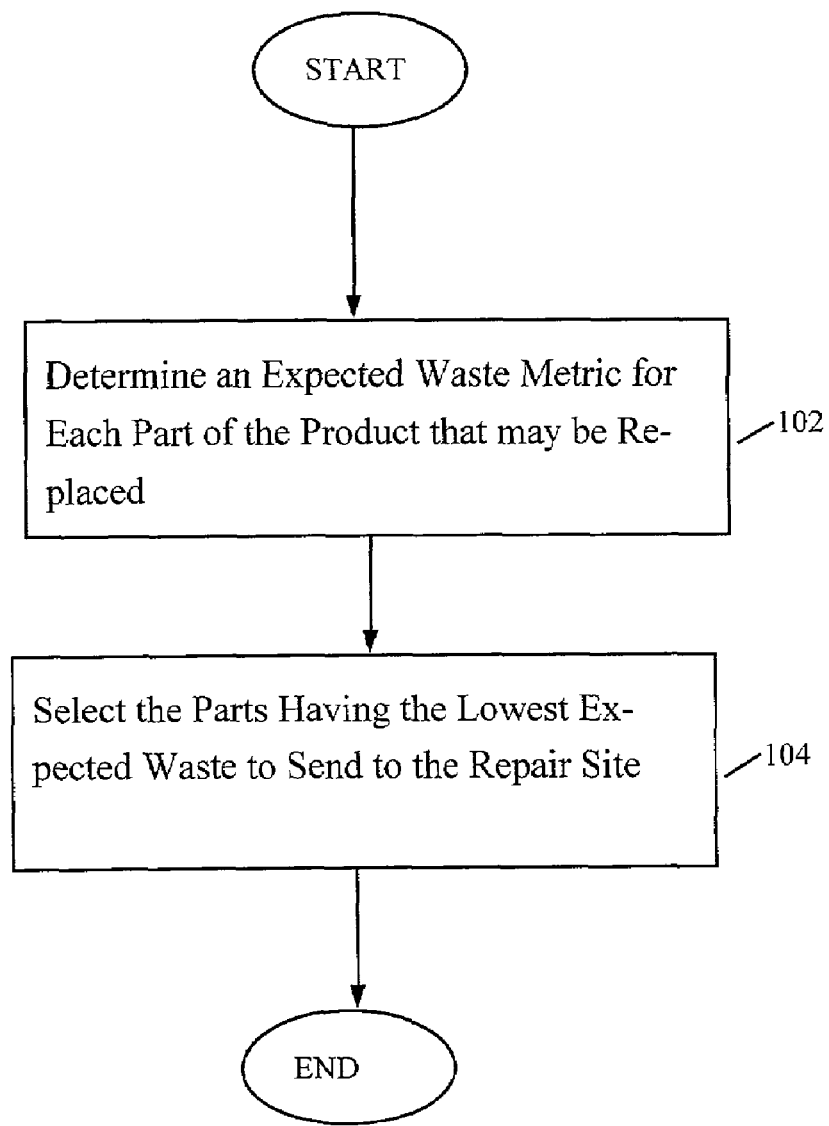
FIG. 1 shows a method for predicting parts for onsite repair according to the present teachings.

FIG. 1 shows a method for predicting parts for onsite repair according to the present teachings. At step 102, an expected waste is determined for each part of a product that may be replaced during the repair of the product. Step 102 may also include determining an expected waste for sets of parts.

An expected waste for a part or set of parts includes waste which is caused by unnecessarily sending a part or set of parts to a repair site and waste which is caused by not sending a needed part or set of parts to the repair site. The expected wastes may be based on symptoms.

At step 104, the parts having the lowest expected waste are selected to be sent to the repair site with a service technician.

Figure 2:
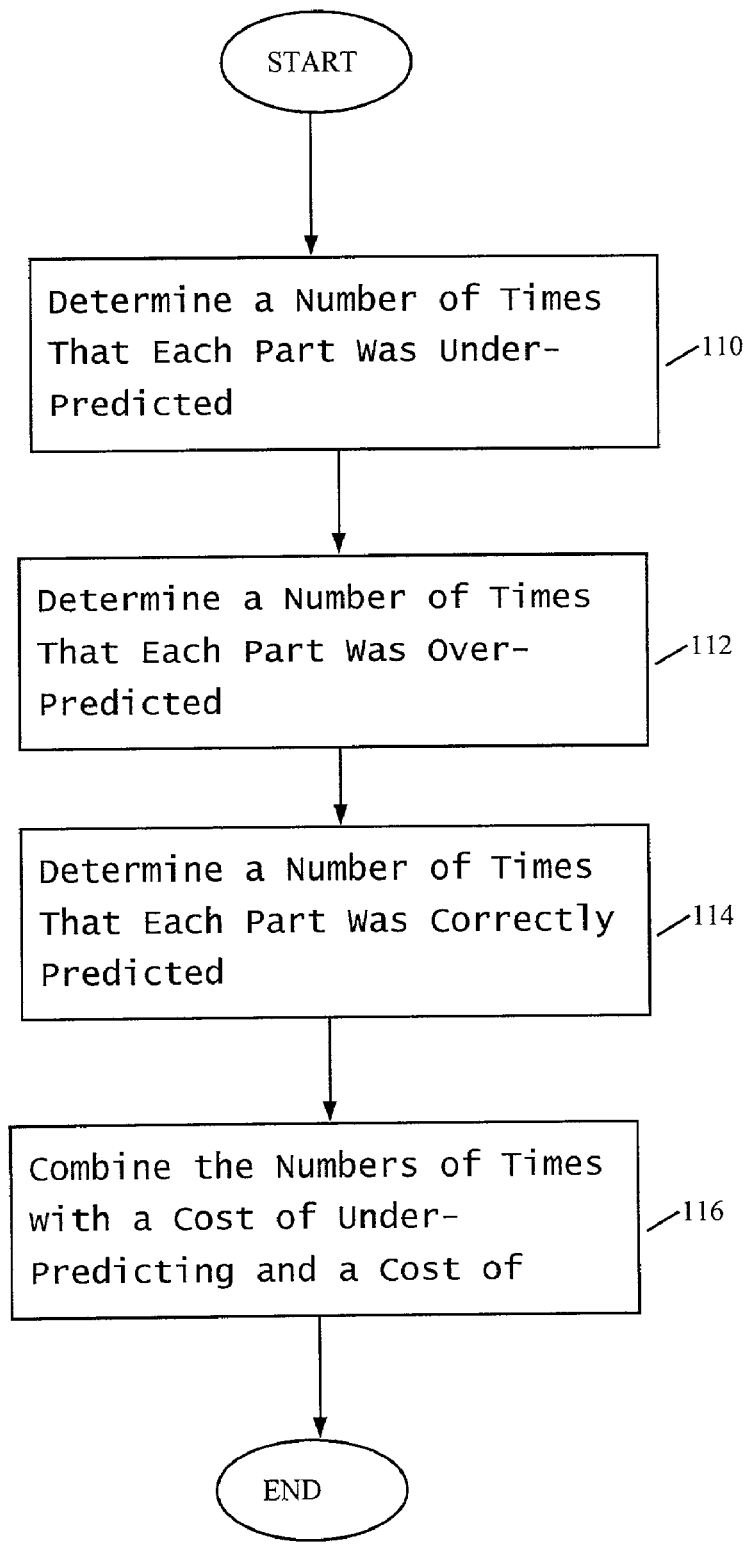
FIG. 2 shows steps in one embodiment for determining expected waste by analyzing a repair history for a product.

FIG. 2 shows steps in one embodiment for determining expected waste by analyzing a repair history for a product. At step 110, the repair history is examined to determine a number of times that each part of the product was under-predicted. At step 112, the repair history is examined to determine a number of times that each part was over-predicted. Then at step 114, the repair history is examined to determine a number of times that each part was correctly predicted. At step 116, the numbers determined at steps 110-114 are combined with a cost associated with under-predicting the parts and a cost associated with over-predicting the parts.

Figure 3:
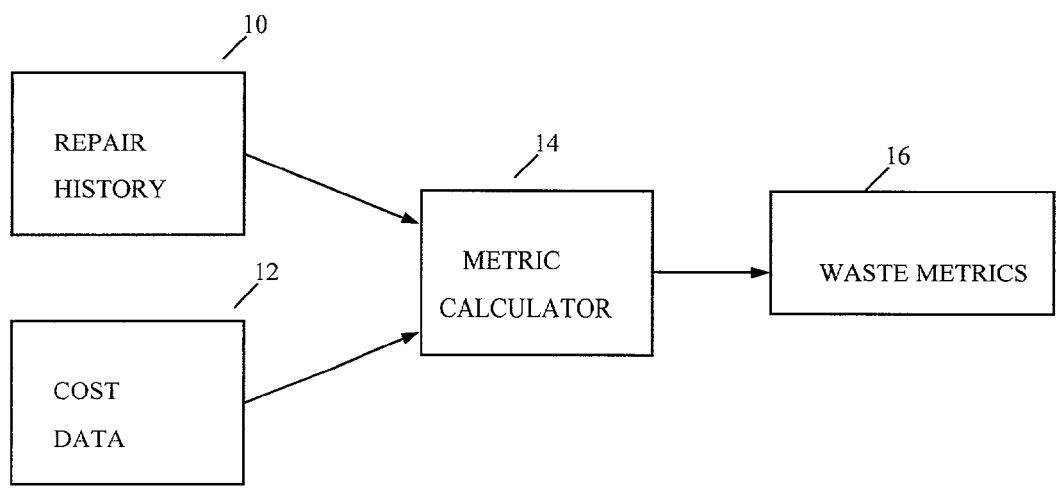
FIG. 3 shows a system for determining expected waste according to the present techniques.

FIG. 3 illustrates a system for determining the expected waste at step 102 according to the present techniques. The expected waste for individual parts or sets of parts is included in a set of waste metrics 16 which are generated by a metric calculator 14 in response to a repair history 10 and a set of cost data 12.

The repair history 10 includes an identification of parts that were sent to repair sites in prior onsite repairs and a list of the actual parts that were needed in the prior onsite repairs. Each part may be identified with a corresponding part number (P).

The repair history 10 may be derived from data that is routinely collected. For example, repair technicians may routinely record when parts are sent on a repair trip but not used and when parts are needed on site but were not in the set of parts that was sent to the site. In addition, records of additional repair trips for the same onsite repair case may be used to determine which parts were actually needed. Also, replaced parts may be sent to a repair center and data may be recorded on the actual part defects.

The metric calculator 14 uses the repair history 10 to tally up separately for each part P the number of times that part P was under-predicted ($X_P$), the number of times that part P was over-predicted ($Y_P$), and the number of times that part P was correctly predicted ($Z_P$).

A part was under-predicted if it was needed for a repair but was not sent on the initial trip to the repair site. A part was over-predicted if it was not needed for a repair but was sent to the repair site. A part was correctly predicted if it was needed for a repair and was sent on the initial trip to the repair site.

The cost data 12 includes the cost associated with over-predicting a part ($C_{O,P}$) and the cost associated with under-predicting a part ($C_{U,P}$).

The costs in the cost data 12 may be average cost figures. For example, the cost associated with under-predicting a part may be an average cost of an extra trip to a repair site to transport the needed part. The cost associated with over-predicting a part may be an average cost of restocking an unneeded part after being returned from the repair site.

Alternatively, the cost of over-predicting a part may include the cost of the part, the cost of storing the part in inventory, the cost of transporting the part, etc. For example, the cost of unnecessarily transporting larger and/or heavier parts may be greater than the cost of unnecessarily transporting smaller and/or lighter parts to a repair site.

Similarly, the cost of under-predicting a part may be adapted in response to a variety of factors. For example, the cost of under-predicting a part may be adjusted for the distance between a repair site and a repair center, i.e. the greater the distance the greater the cost of transporting the needed part to the repair site in a subsequent trip to the repair site. The cost of under-predicting a part may be adjusted for the nature of the support contracts involved. For example, the cost of under-predicting a part for a customer with a 24 hour guarantee support contract may be higher than the cost of under-predicting for a 30 day guarantee contract. The cost of under-predicting may be adjusted on the basis of part type—for example a part used in a high-end system in air-traffic control versus a part used in a home printer, etc.

All of these costs may also be customized based on additional information about a case such as a problem description.

The waste metrics 16 include the total waste for each part P ($TW_P$) which is given by the following.

$$TW_P = X_P * C_{U,P} + Y_P * C_{O,P}$$

The waste metrics 16 include the average or expected waste per repair for each part P ($EW_P$) which is the total waste divided by the total number of repairs:

$$EW_P = TW_P / (X_P + Y_P + Z_P)$$

The repeat trip rate for part P is the fraction of times when part P was needed but not included, i.e. $X_P/X_P+Z_P$. The over-predict rate for part P is the fraction of times when Part P was taken along unnecessarily, i.e. $Y_P/Y_P+Z_P$.

The above analysis may be applied on a per product model basis or a per call center basis or a per call qualifier basis, etc. A call center may be defined as a facility which receives customer reports of product failures and which dispatches repair technicians with repair parts. A call qualifier may be defined as an individual or automated system or combination thereof that obtains problem symptoms from customers.

Table 1 shows an example set of waste metrics 16 generated by the metric calculator 14 for an example set of parts (part numbers 1-5). The waste metrics 16 include the number of under-predictions $X_1$ through $X_5$, the number of over-predictions $Y_1$ through $Y_5$, and the number of correct predictions $Z_1$ through $Z_5$ along with the total waste and expected waste for each of the parts 1 through 5 In this example, the cost data 12 specifies that an average cost of an extra trip to a repair site to obtain an under-predicted part is $ET (i.e. $C_{U,P}$=$ET) and the average cost of restocking an over-predicted part is $R (i.e. $C_{O,P}$=$R).

TABLE 1

| Part Num. (P) | Under- Pred. $X_P$ | Over- Pred. $Y_P$ | Correct Pred. $Z_P$ | Total Waste $TW_P$ | Expected Waste $EW_P$ |
|---|---|---|---|---|---|
| 1 | 181 | 79 | 506 | ET*181 + R*79 | (ET*181 + R*79)/(181 + 79 + 506) |
| 2 | 160 | 97 | 376 | ET*160 + R*97 | (ET*160 + R*97)/(160 + 97 + 376) |
| 3 | 106 | 61 | 340 | ET*106 + R*61 | (ET*106 + R*61)/(106 + 61 + 340) |
| 4 | 90 | 49 | 411 | ET*90 + R*49 | (ET*90 + R*49)/(90 + 49 + 411) |
| 5 | 89 | 61 | 117 | ET*89 + R*61 | (ET*89 + R*61)/(89 + 61 + 117) |

For example, the part number 1 had 181 under-predicts and 79 over-predicts and 506 correct predicts as derived from the repair history 10 by the metric calculator 14. This corresponds to an under-predict/repeat trip rate of 0.263 and an over-predict rate of 0.135.

The total waste column of Table 1 is $ET times the number of under-predictions plus $R times the number of over-predictions. The expected waste column of Table 1 is the total waste divided by the total number of predictions involving the corresponding part which is $X_P+Y_P+Z_P$.

The repair history 10 may specify parts that were replaced but later determined to be not faulty. Such parts may be counted as over-predictions when determining the waste metrics 16. Such parts may have a higher per-part cost than the parts that were not replaced.

The metric calculator 14 may determine waste metrics for sets of parts. For example, any combination of the example parts 1-5 may be sent to a repair site as a set. For each possible set of parts, the repair history 10 may be used to derive the number of times that the set was under-predicted, the number of times the set was over-predicted, and the number of times the set was correctly predicted. A set was under-predicted if it was sent on the initial trip to the repair site but did not include a needed part. A set was over-predicted if it was sent on the initial trip to the repair site but included parts that were not needed. A set was correctly predicted if it was sent on the initial trip to the repair site and included the exact parts needed for the repair. For sets of parts, the waste metrics may be adjusted because the cost of an over-prediction may be multiplied by the number of excessive parts. For example, if three RAM memory chips were sent and only one was needed, then the over-predict cost is $C_{O,RAM}*2$.

The metric calculator 14 may adapt the waste metrics 16 to particular symptoms exhibited by the product needing repair. The use of symptoms may improve the quality of prediction. For example, in a computer system repair more waste is associated with replacing a motherboard in response to a "toner cartridge low" symptom in comparison to a "blue screen" symptom. The symptoms of the product to be repaired may be identified in any manner using an automated system or human intervention or a combination of automation and human intervention. The repair history 10 provides information on prior repairs and associated symptoms.

The expected waste is EW(p|s) for any subset s of symptoms S and subset p of parts P. The expected waste is EW(p|s) combines the probability that p is insufficient to address the problem (probability given symptoms s) with the cost of under-prediction and the probability that p contains parts that are not needed given s with the cost of sending those unnecessary parts.

In one embodiment, the expected waste for a subset of parts p and a given set of symptoms s is as follows $$EW(p|s) = (X_{p,s} * C_{U,P} + Y_{p,s} * C_{O,P}) / (X_{p,s} + Y_{p,s} + Z_{p,s})$$

where $X_{P,S}$ is the number of trips where symptoms s were reported, parts p were sent, and at least one part not in p was needed to complete the repair, $Y_{p,s}$ is the number of trips where symptoms s were reported, parts p were sent, and p included at least one part that was unnecessary in the repair, and $Z_{p,s}$ is the number of trips in which symptoms s were reported, parts p were sent, and all parts in p and no other parts were needed to complete the repair.

Another use for the waste metrics 16 is to decide for which parts the training of call qualifiers should be upgraded. For example, call qualifiers may undergo retraining for parts which have a relatively high rate of mis-prediction.

Another use for the waste metrics 16 is to decide which parts to have a computer flag to the call qualifiers. Such flagged parts may have, for example, the most over-predicted waste cost.

Yet another use for the waste metrics 16 is to decide which parts are the best to stock in a repair vehicle using the most under-predicted waste cost. This may also help, for example, in the development of standard part kits.

Another use for the waste metrics 16 is to decide which products are least desirable to support, i.e. product models with greatest waste.

Another use for the waste metrics 16 is to decide which call qualifiers and/or repair technician to target for additional training. For example, persons with greatest total waste may be targeted for retraining.

In some embodiments, computational time may be reduced by not applying the above analysis to all possible sets of parts p. Instead, a reasonable level of confidence in the quality of a solution may be found by using heuristics. For example, starting with an empty set, the expected waste of not sending any parts given these symptoms is computed. Thereafter, the expected waste of sending one single part for each individual part given the symptoms is computed. This is computed for all individual parts. All possible combinations of two parts may be considered starting with the combinations of the parts with the lowest individual expected waste given the symptoms. Combinations of three parts, etc., are then considered until computational time is exhausted or until a point is reached where adding parts only increases expected waste or until all possible sets of parts are considered.

The present techniques for identifying costly repair parts and for determining parts to send to a repair site may be performed by automated means such as a computer system.

The cost information generated may be used to improve and/or focus the training of call qualifiers or focus the attention of management as well as in the design of future products. For example, these methods may be used to identify parts that are difficult to predict, parts that call qualifiers normally do not think of, etc.

The techniques disclosed herein may be performed by a human being or an automated system such as a computer or a combination thereof. For example, the functions of the metric calculator 14 may be implemented in software for a computer system and the repair history 10 and/or cost data 12 may be obtained from computer system files including data bases.

The foregoing detailed description of the present invention is provided for the purposes of illustration and is not intended to be exhaustive or to limit the invention to the precise embodiment disclosed. Accordingly, the scope of the present invention is defined by the appended claims.

What is claimed is:

1. A method executed by a computer, comprising:
   determining, by the computer, costs of mis-predicting parts that may be replaced during an onsite repair of a product in response to a repair history, wherein the costs are computed based on probabilities of over-predicting and under-predicting the parts;
   selecting, by the computer, a subset of the parts to be sent to the onsite repair in response to the costs; and
   selecting, by the computer, another subset of the parts for training of call qualifiers in response to the costs.

2. A method executed by a computer, comprising:
   determining, by the computer, costs of mis-predicting parts that may be replaced during an onsite repair of a product in response to a repair history, wherein the costs are computed based on probabilities of over-predicting and under-predicting the parts;
   selecting, by the computer, a subset of the parts to be sent to the onsite repair in response to the costs; and
   determining, by the computer, which personnel to target for additional training in response to the costs.

3. The method of claim 2, wherein computing the costs based on the probabilities of over-predicting the parts comprises computing the costs associated with unnecessarily sending the corresponding parts to the onsite repair.

4. The method of claim 2, wherein computing the costs based on the probabilities of under-predicting the parts comprises computing the costs associated with not sending the corresponding parts when needed to the onsite repair.

5. The method of claim 2, wherein computing the costs based on the probabilities of over-predicting and under-predicting is according to:
   numbers of times that the corresponding parts were under-predicted;
   numbers of times that the corresponding parts were over-predicted;
   numbers of times that the corresponding parts were correctly predicted.

6. The method of claim 2, wherein determining the costs includes determining an average of the costs associated with under-predicting and over-predicting the parts.

7. The method of claim 2, wherein selecting the subset of the parts includes selecting the subset of the parts for transport to the onsite repair.

8. The method of claim 2, wherein selecting the subset of the parts includes selecting the subset of the parts for flagging to call qualifiers.

9. The method of claim 2, wherein selecting the subset of the parts includes selecting the subset of the parts for stocking a repair vehicle.

10. The method of claim 2, further comprising determining which products are least desirable to support in response to the costs.

11. The method of claim 2, wherein determining the costs of mis-predicting the parts is for a particular onsite repair of a particular product, and wherein selecting the subset of the parts is for the particular onsite repair of the particular product.

12. The method of claim 2, wherein determining the costs of mis-predicting parts comprises determining the costs of mis-predicting corresponding sets of parts.

13. The method of claim 2, wherein computing the costs based on the probabilities of over-predicting and under-predicting takes into account a cost of an extra trip to a repair site and a cost of one of restocking and storing an unneeded part.

14. The method of claim 2, wherein selecting the subset of parts comprises selecting less than all the parts.

15. The method of claim 5, further comprising:
   computing the probabilities of under-predicting the parts using the numbers of times that the parts were under-predicted; and
   computing the probabilities of over-predicting the parts using the numbers of times the parts were over-predicted.

16. The method of claim 12, wherein selecting the subset of parts comprises selecting less than all of the sets of parts.

17. An apparatus having a computing device that determines costs of mis-predicting parts that may be replaced during an onsite repair of a product in response to a repair history and that selects a subset of the parts to be sent to the onsite repair in response to the costs,
   wherein the costs are computed based on probabilities of over-predicting and under-predicting the parts,
   wherein the computing device computes the costs based on the probabilities by determining numbers of times that the corresponding parts were under-predicted and numbers of times that the parts were over-predicted and numbers of times that the corresponding parts were correctly predicted, the repair history containing the numbers of times that the corresponding parts were under-predicted, the numbers of times that the parts were over-predicted, and the numbers of times that the corresponding parts were correctly predicted.

18. The apparatus of claim 17, wherein the repair history includes an identification of a set of parts sent to a set of prior onsite repairs and a list of actual parts needed in the prior onsite repairs.

19. The apparatus of claim 17, wherein the costs determined by the computing device comprise waste metrics for a plurality of sets of parts and the subset of parts selected comprises less than all the sets of parts for the onsite repair in response to the waste metrics.

20. The apparatus of claim 17, wherein the parts are selected for transport to the onsite repair.

21. The apparatus of claim 17, wherein the parts are selected for training of call qualifiers.

22. The apparatus of claim 17, wherein the parts are selected for flagging to call qualifiers.

23. The apparatus of claim 17, wherein the parts are selected for stocking a repair vehicle.

24. The apparatus of claim 17, wherein the computing device determines which products are least desirable to support in response to the costs.

25. The apparatus of claim 17, wherein the computing device determines which personnel to target for additional training in response to the costs.

26. A method executed by a computer, comprising:

determining, by the computer, costs of mis-predicting parts that may be replaced during an onsite repair of a product in response to a repair history, wherein the costs are computed based on probabilities of over-predicting and under-predicting the parts; and selecting, by the computer, a subset of the parts to be sent to the onsite repair in response to the costs, wherein determining the costs of mis-predicting comprises determining expected wastes for the corresponding parts, wherein each expected waste is computed based on a number of times the corresponding part was under-predicted, a number of times the corresponding part was over-predicted, a number of times the corresponding part was correctly predicted, a cost of over-predicting the corresponding part, and a cost of under-predicting the corresponding part, wherein the repair history contains the number of times the corresponding part was under-predicted, the number of times the corresponding part was over-predicted, and the number of times the corresponding part was correctly predicted.

* * * * *